United States Patent
Schweizer et al.

(10) Patent No.: US 12,190,105 B2
(45) Date of Patent: Jan. 7, 2025

(54) METHOD FOR CONTROLLING A ROBOTIC DEVICE

(71) Applicant: Robert Bosch GmbH, Stuttgart (DE)

(72) Inventors: Markus Schweizer, Vaihingen/Enz (DE); Andreas Heyl, Weil Der Stadt (DE); Peter Munk, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 161 days.

(21) Appl. No.: 18/160,047

(22) Filed: Jan. 26, 2023

(65) Prior Publication Data

US 2023/0266964 A1  Aug. 24, 2023

(30) Foreign Application Priority Data

Feb. 22, 2022  (DE) ...................... 10 2022 201 857.5

(51) Int. Cl.
*G06F 8/71* (2018.01)
*B60W 50/00* (2006.01)
*G06F 8/65* (2018.01)

(52) U.S. Cl.
CPC .............. *G06F 8/71* (2013.01); *B60W 50/00* (2013.01); *G06F 8/65* (2013.01)

(58) Field of Classification Search
CPC ............. G06F 8/65; G06F 8/71; B60W 50/00
See application file for complete search history.

(56) References Cited

U.S. PATENT DOCUMENTS

| | | | | |
|---|---|---|---|---|
| 10,853,058 | B1 * | 12/2020 | Ouzan ...................... | G06F 8/71 |
| 10,884,902 | B2 * | 1/2021 | Kislovskiy .......... | G06F 11/0706 |
| 11,175,660 | B1 * | 11/2021 | Fields ................... | B60W 10/04 |
| 11,182,132 | B1 * | 11/2021 | Vompolu .................. | G06F 8/75 |
| 11,526,421 | B2 * | 12/2022 | Sundaresan ......... | G06F 11/3664 |
| 11,616,692 | B1 * | 3/2023 | Giaquinto ........... | H04L 41/0816 709/220 |

(Continued)

FOREIGN PATENT DOCUMENTS

| | | | | |
|---|---|---|---|---|
| CN | 106970865 B | * | 10/2020 | .......... G06F 11/0751 |
| CN | 110245033 B | * | 7/2023 | ............. B60R 16/02 |

(Continued)

OTHER PUBLICATIONS

Casquina et al., "A Proposal for Organizing Source Code Variability in the Git Version Control System", 2021, ACM (Year: 2021).*

(Continued)

*Primary Examiner* — Wei Y Zhen
*Assistant Examiner* — Junchun Wu
(74) *Attorney, Agent, or Firm* — NORTON ROSE FULBRIGHT US LLP; Gerard A. Messina

(57) ABSTRACT

A method for controlling a robotic device. In the method, for a version of a control software which is not the initial version of the control software for which the test values delivered by the tests at least partially do not fall within predefined ranges, it is checked whether that version of the control software fulfills safety criteria that have been created for a previous version (and are fulfilled by that version) for which the test values delivered by the tests at least partially do not fall within the predefined ranges, but was safe. If this is the case, the robotic device is controlled with that version of the control software.

7 Claims, 3 Drawing Sheets

(56) References Cited

U.S. PATENT DOCUMENTS

| | | | | |
|---|---|---|---|---|
| 2007/0021844 | A1* | 1/2007 | Kuhls | G06F 8/65 700/19 |
| 2011/0202905 | A1* | 8/2011 | Mahajan | G06F 8/71 717/140 |
| 2015/0286478 | A1* | 10/2015 | Patton | G06F 11/34 717/175 |
| 2016/0085533 | A1* | 3/2016 | Jayanti Venkata | H04L 41/28 717/175 |
| 2017/0132120 | A1* | 5/2017 | Salameh | G06F 9/44505 |
| 2017/0147338 | A1* | 5/2017 | Jackson | G06F 11/36 |
| 2019/0026217 | A1* | 1/2019 | Yim | G06F 8/00 |
| 2021/0091956 | A1* | 3/2021 | Mullett | G06F 8/71 |
| 2022/0171616 | A1* | 6/2022 | Ghanbari Milani | G06F 30/20 |
| 2022/0222353 | A1* | 7/2022 | Nagaraja | G06F 11/3688 |
| 2023/0004381 | A1* | 1/2023 | Ma | G06F 8/658 |
| 2023/0289166 | A1* | 9/2023 | Sumcad | G06F 8/65 |

FOREIGN PATENT DOCUMENTS

| | | | | |
|---|---|---|---|---|
| CN | 112181449 B | * | 10/2023 | G06F 8/65 |
| CN | 112860313 B | * | 1/2024 | G06F 8/71 |
| CN | 110892375 B | * | 3/2024 | G06F 11/368 |

OTHER PUBLICATIONS

Rothermel et al., "A Safe, Efficient Regression Test Selection Technique", Apr. 1997, ACM, vol. 6, No. 2, pp. 173-210. (Year: 1997).*

Poinet et al., "Collaborative Workflows and Version Control Through Open-Source and Distributed Common Data Environment", 2021, Springer Nature Switzerland (Year: 2021).*

Wahler et al., "Disruption-free Software Updates in Automation Systems", 2014, IEEE (Year: 2014).*

Hosek et al., "Safe Software Updates via Multi-version Execution", 2013, IEEE (Year: 2013).*

Waltersdorfer et al., "Version Management and Conflict Detection Across Heterogeneous Engineering Data Models", 2010, IEEE (Year: 2010).*

* cited by examiner

METHOD FOR CONTROLLING A ROBOTIC DEVICE

CROSS REFERENCE

The present application claims the benefit under 35 U.S.C. § 119 of German Patent Application No. DE 10 2022 201 857.5 filed on Feb. 22, 2022, which is expressly incorporated herein by reference in its entirety.

FIELD

The present description relates to a method for controlling a robotic device.

BACKGROUND INFORMATION

Control software for robotic devices such as, for example, vehicles (in particular, autonomous vehicles) are typically created in an iterative process, i.e., once it is written, it does not remain the same, but is successively updated, so that there is a chain or sequence of versions of the control software. For each version of the control software, however, it must be checked whether the control of the robotic device is safe using that version of the control software (i.e., the control of the robotic device is safe using that control software). For this purpose, predefined tests may be carried out, which output test values indicating that the control software is safe if it falls within predefined ranges.

It may, however, be that the control of the robotic device according to one version of the control software is safe, even though the tests fail, i.e., the test values for that version of the control software do not fall within the predefined ranges. Such versions of a control software may therefore still be used for controlling a robotic device and there are approaches that are desirable which enable this in an efficient and, if necessary, automated manner for a sequence of control software versions as occurs in an iterative software development process.

SUMMARY

According to various specific example embodiments of the present invention, a method is provided for controlling a robotic device, which includes: generating a sequence of versions of a control software for the robotic device via successive updates of the control software and, for each version of the control software,
  carrying out tests, which deliver test values which, when they fall within predefined ranges, indicate that the control of the robotic device is safe with that control software,
  if the version of the control software is the initial version of the control software, for which the test values delivered by the respective tests do not at least partially fall within the predefined ranges:
  checking whether the control of the robotic device is safe with that version of the control software and, if the control of the robotic device is safe with that version of the control software,
  creating safety criteria that are fulfilled by that version of the control software, and controlling the robotic device using that (i.e., with that) version of the control software;
  if the version of the control software is not the initial version of the control software for which the test values delivered by the respective tests do not at least partially fall within the predefined ranges:
  checking whether that version of the control software fulfills the created safety criteria and, if that version of the control software fulfills the created safety criteria, controlling the robotic device using that version of the control software and, if that version of the control software does not fulfill the created safety criteria, checking whether the control of the robotic device is safe with that control software and adapting the safety criteria and/or the tests and controlling the robotic device using that version of the control software, if the control of the robotic device with that version of the control software is safe;
  updating the version of the control software to the next version of the control software of the sequence, if the control of the robotic device with that version of the control software is not safe.

The method according to the present invention described above enables an efficient, automatic enablement of versions of a control software for controlling a robotic device and a corresponding control of the robotic device, since it may be automatically checked whether safety criteria fulfilled for previous versions of the control software are also fulfilled for an instantaneous version. If this is the case, the control software may be immediately used, even if it does not fulfill predefined tests (such as unit tests) or also a predefined test coverage.

If it is established for an (instantaneous) version that the control of the robotic device is not safe with that version, a switch is made to the next version and the robotic device is not controlled using the instantaneous version. If the control of the robotic device is safe with that version, it may be used to control until it is superseded by a new version.

If the test values delivered by the respective tests fall within the predefined ranges, the robotic device may be controlled using that version of the control software.

It should be noted that if the tests have been adapted, the instantaneous version of the control software is no longer a version of the control software that does not fulfill the tests (in particular, no longer the initial one thereof), since it now fulfills the tests and other tests are subsequently carried out.

The safety criteria, if they are adapted, are replaced after their adaptation by the adapted safety criteria.

Various exemplary embodiments of the present invention are specified below.

Exemplary embodiment 1 is a method for controlling a robotic device as described above.

Exemplary embodiment 2 is the method according to exemplary embodiment 1 where, if the version of the control software is not the initial version of the control software for which the test values delivered by the respective tests do not at least partially fall within the predefined ranges, differences between that version of the control software and the initial version of the control software, for which the test values delivered by the tests do not at least partially fall within the predefined ranges, are ascertained and it is checked on the basis of the ascertained differences whether that version of the control software fulfills the created safety criteria.

This enables an efficient determination of whether the instantaneous version fulfills the safety criteria (reasons) created for the previous version. For example, the case may occur that the differences have no affect at all on the safety criterion, for example, because the differences have no affect at all on a safety-relevant result of the control software. If, for example, the safety criterion is that a check of results is provided, then it may be checked, for example, whether the instantaneous version differs from the previous version to the extent that the check is omitted. In this case, the instantaneous version would no longer fulfill the safety criterion.

Exemplary embodiment 3 is the method according to exemplary embodiment 1 or 2, where the tests are unit tests and the test values are results of the unit tests and are coverage values that indicate the coverage of the unit tests.

If such tests are positive and if a sufficient coverage is ensured, i.e., the coverage values fall within predefined ranges, it is ensured that the control software is safe.

Exemplary embodiment 4 is a method according to one of exemplary embodiments 1 through 3, including prompting a user to create the safety criteria and/or to adapt the safety criteria.

The decision-making process of whether a software version is used for controlling the robotic device may thus be automatically carried out and the user is included if the safety criteria are (if necessary) created and adapted. Expert knowledge may thus be integrated into the decision-making process and a software version may be used, even if it does not pass the tests or the test coverage is insufficient. A user may also be included in this manner for adapting the tests.

Exemplary embodiment 5 is a method according to one of exemplary embodiments 1 through 4, where the safety criteria include parameter values and the adaptation of the safety criteria include the adaptation of the parameter values.

For example, the safety criteria may include tolerances (or limiting values), which are adapted in such a way that (if justified) they are fulfilled by the instantaneous version. Accordingly, the check of whether the instantaneous version fulfills the safety criteria may include checking whether the instantaneous version adheres to the tolerances (or limiting values).

Exemplary embodiment 6 is a control unit, which is configured to carry out a method according to one of exemplary embodiments 1 through 5.

Exemplary embodiment 7 is a computer program including commands which, when they are executed by a processor, prompt the processor to carry out a method according to one of exemplary embodiments 1 through 5.

Exemplary embodiment 8 is a computer-readable medium, which stores commands which, when they are executed by a processor, prompt the processor to carry out a method according to one of exemplary embodiments 1 through 5.

BRIEF DESCRIPTION OF THE DRAWINGS

In the figures, similar reference numerals relate in general to the same parts in all the different views. The figures are not necessarily true to scale, the emphasis instead lying in general on the representation of the principles of the present invention. In the following description, different aspects are described with reference to the figures.

DETAILED DESCRIPTION OF EXAMPLE EMBODIMENTS

The following detailed description refers to the figures, which for the purpose of illustration show specific details and aspects of this description in which the present invention may be carried out. Other aspects may be used and structural, logical and electrical changes may be carried out without departing from the scope of protection of the present invention. The various aspects of this description are not necessary mutually exclusive, since some aspects of this description may be combined with one or with multiple other aspects of this description in order to form new aspects.

Various examples are described in greater detail below.

Figure 1:
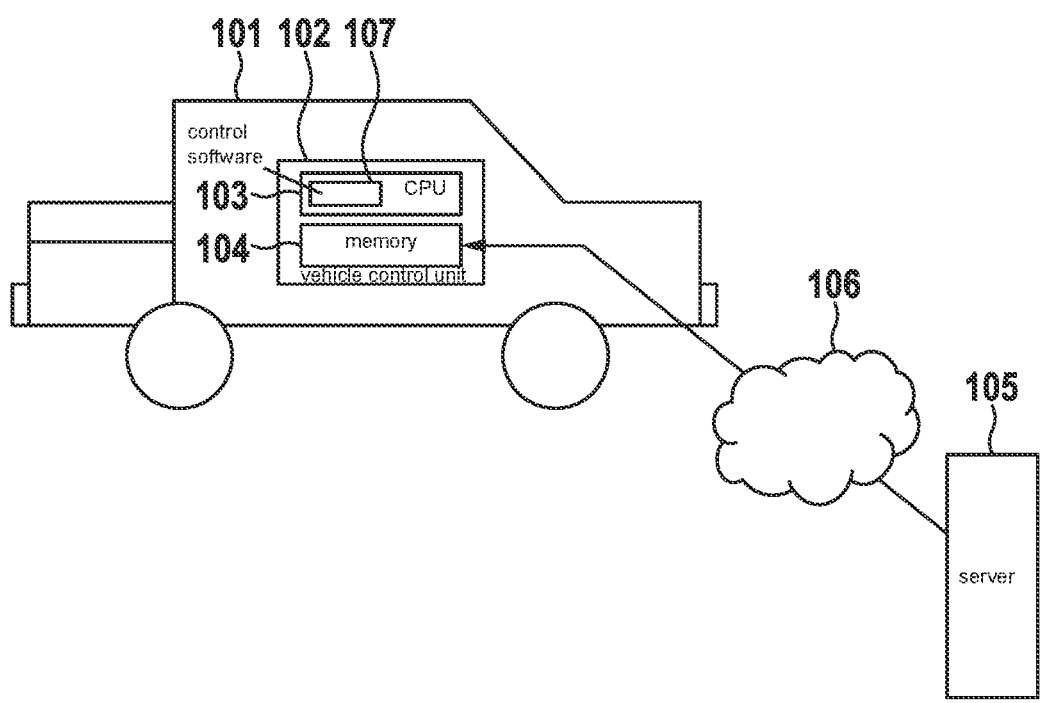
FIG. 1 shows a vehicle.

FIG. 1 shows a vehicle 101.

In the example of FIG. 1, a vehicle 101, for example, a passenger vehicle or a truck, is provided with a vehicle control unit, (for example, an electronic control unit (ECU)) 102.

Vehicle control unit 102 includes data processing components, for example, a processor (for example, a CPU (central processing unit)) 103 and a memory 104 for storing control software 107, according to which vehicle control unit 102 operates, and data, which are processed by processor 103.

For example, the stored control software (computer program) includes instructions which, when the processor executes them, prompt processor 103 to execute driver assistance functions (or also to collect driving data) or to even autonomously control the vehicle.

Over the course of its development process, software is typically successively updated, which results in a sequence of versions of control software 107. For example, software 107 is updated in a server 105 and the updated control software is transferred to the vehicle, for example, via a network 106.

In such a context, it is extremely important that each version of control software 107 that is transferred to vehicle 101 and used there for control enables a safe control of vehicle 101.

It is typically provided that a software is tested using unit tests. For software that are safety-critical, this may be required by corresponding regulations (for example, depending on the ASIL (Automotive Safety Integrity Level)).

In the event, however, that such a unit test for the version of a control software 107 ends with a negative result, the use of that version of control software 107 is still safe if corresponding reasons (i.e., a corresponding argument) are present, i.e., corresponding safety criteria are fulfilled. A test result may, in particular, be acceptable from the perspective of functional safety (and fulfill a safety criterion, for example, taking further factors into account), even if, for example, a test result does not fall within a predefined range.

The measurement of so-called coverage metrics may also be provided or required. Coverage metrics provide statements about the test coverage, for example, Statement Coverage (code lines), Branch Coverage (branches) or Modified Condition/Decision Coverage (MC/DC). Target values may also be defined for these test values (of the coverage metrics) as well. If such a target value is not achieved for a version of control software 107, reasons may in turn be present as to why that version of control software 107 is still safe. The tests may be adapted in this case as well.

Test values are understood below to mean both the results of tests, which assess the safety or functionality, etc. (i.e., meeting the targets) of a version of a control software, as well as values of coverage metrics with respect to a test coverage. Such test values may fall within predefined ranges (for example, test coverage above threshold value or test result "positive"), which indicates that the respective version of the control software may or may not be used.

In the iterative development of software, the software is changed with regards to the content. For one version of control software 107, the test values may fall outside the predefined ranges, but reasons may be present (i.e., safety criteria are fulfilled) as to why the control of vehicle 101 is still safe.

If the software is further developed to form a later version, these reasons may still be valid (i.e., the safety criteria are fulfilled) even after the further development, i.e., for the later version, in particular, also when the test values, for example, the coverage metrics, have continued to deteriorate during the further development.

According to various specific embodiments, this is checked, for example, by server 105 for a new version of control software 107 in an automated manner.

This takes place, for example, with the aid of or depending on the type of reason, why a test error or a non-fulfillment of the coverage metrics is acceptable from the perspective of functional safety. A reasoning of this type is also referred to below as "argument pattern."

Such argument patterns in this case are, in principle, parameterizable and thus enable the direct connection to specific architecture elements, and are a simple adaptation to application-specific metrics to be quantitatively achieved.

Figure 2:
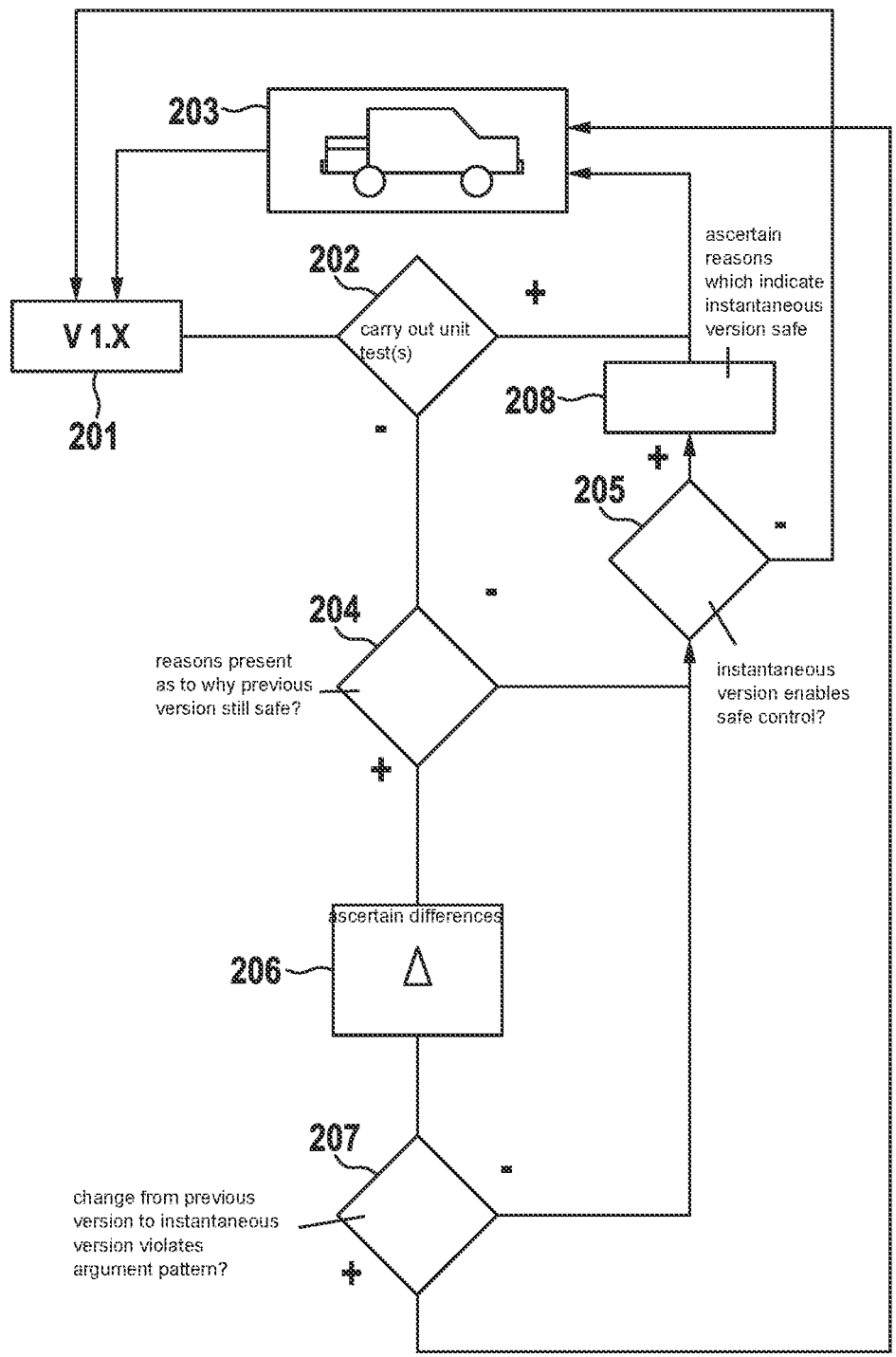
FIG. 2 shows a diagram that illustrates a flowchart in an iterative development of a control software, according to an example embodiment of the present invention.

FIG. 2 shows a diagram, which illustrates a flowchart in an iterative development of a control software, for example, control software 107 for the vehicle or also of another robotic device.

In 201, an (instantaneous) version of the control software is created, starting with an initial version of the control software.

In 202, one or multiple unit tests are carried out for that version of the control software. If the test results are positive and if the values of the coverage metrics are sufficient, that version of control software is used in 203 and the process returns to 201 for a new version.

If, in contrast, the test values are not at least partially within predefined ranges (for example, one or multiple test results is/are negative or coverage is too minimal), then it is checked in 204 whether reasons are present as to why a previous version was still safe. Such reasons are present only if in a previous version the test values were at least partially not within the predefined ranges and reasons (i.e., safety criteria fulfilled for the previous version) have been ascertained for this previous version.

If no such reasons are present (which is the case, in particular, if the instantaneous version is the initial version, for which test values at least partially do not fall within predefined ranges), it is checked in 205 whether the instantaneous version of the control software enables a safe control.

If this is the case, reasons (or safety criteria fulfilled by the instantaneous version of the control software) are ascertained in 208, which indicate that the instantaneous version of the control software is safe. The tests may also be adapted so that they are fulfilled by the instantaneous version. In this case, the reasons do not have to be created.

If the instantaneous version is not safe, a switch is made directly to a new version without using the instantaneous version, i.e., the process jumps directly to 201.

This may occur, for example, through users by selecting a suitable argument pattern. The user may be prompted (for example by server 105).

The reasons thus ascertained are subsequently filed together with or assigned to the instantaneous version of the control software and its test values in a machine-readable manner, i.e., stored, for example as argument patterns including respective parameter values.

That version of the control software is then used in 203 and the process returns to 201 for a new version.

If reasons are present as to why a previous version was still safe, then differences between the instantaneous version and the previous version, for which the reasons have been selected, are ascertained in 206.

In 207, it is then checked using the result of this comparison as a function of the respective reasons whether or not the change from the previous version to the instantaneous version violates the argument pattern. If the reasons are not violated, that version of the control software is then used in 203 and the process returns to 201 for a new version.

This may occur fully automatically and, for example, a notification to the user (for example, a prompt to the user) may be dispensed with.

The information about the successful automatic check may be filed together with or assigned to the instantaneous version of the control software and its test values, i.e., stored, in a machine-readable manner.

If the reasons for the instantaneous version of the control software are not valid, then it is checked in 205 whether the instantaneous version of the control software enables a safe control and, if this is the case, reasons are ascertained again in 208 or the present reasons are adapted. For this purpose, a user may again be prompted. The tests may also be adapted, so that these are fulfilled by the instantaneous version. In this case, the reasons do not have to be adapted.

If the instantaneous version is not safe, a switch is made directly to a new version without using the instantaneous version, i.e., the process jumps directly to 201.

As mentioned above, reasons or fulfilled safety criteria may be present in the form of argument patterns. Examples thereof are argument pattern 1: generic text argument pattern 2: use of Defensive Programming (i.e., all input values of the software, for example are checked against possible errors and, if necessary, alternative measures are taken)

argument pattern 3: automated (model-based) functional check of the safety relevance of changed calculation results of the software, for example, only the result/the results ([x, y, . . . ] is/are safety-relevant argument pattern 4: an automated (model-based) functional check of the assurance of changed calculation results takes place further back in the signal flow, for example, the result of the software is checked, filtered, limited, . . . by one or multiple subsequent software components [A, B, . . . ]

Associated checks (in 207 in FIG. 2) would then, for example, be as follows:

For argument pattern 1: in a generic text, each change to the software component results in a violation of the argument pattern, i.e., the check in 207 leads to a negative result.

For argument pattern 2: the reason "Defensive Programming" is violated if the target values of the cover metrics are undercut by a previously defined percentage value. A potential percentage value is largely a function of the application, for example, of what percent of the input value or output value of a considered component is even safety-relevant and per Defensive Programming would have to be taken into account.

For argument pattern 3: it is checked with the aid of static code analysis whether the change of the software (from the previous to the instantaneous version, as ascertained in 206) has influenced the results [x, y, . . . ] of the software component. This takes place, for example, with the aid of an Abstract Syntax Tree and checking whether the corresponding command lines that have an influence on the selected result have been changed. If no influence is established, argument pattern 3 is considered to be not violated.

For argument pattern 4: the software architecture is analyzed and checked whether the indicated subsequent software functions exist and whether these also actually receive data from the instantaneous version of the software. For this purpose, a machine-readable software architecture model is used, for example. Alternatively, the entire software may be used and checked with the aid of static code analysis whether a data flow exists between the inputs of the specified software components [A, B, . . . ] and the result of the instantaneous version of the software. If this is the case, the argument pattern is considered to be not violated.

Figure 3:
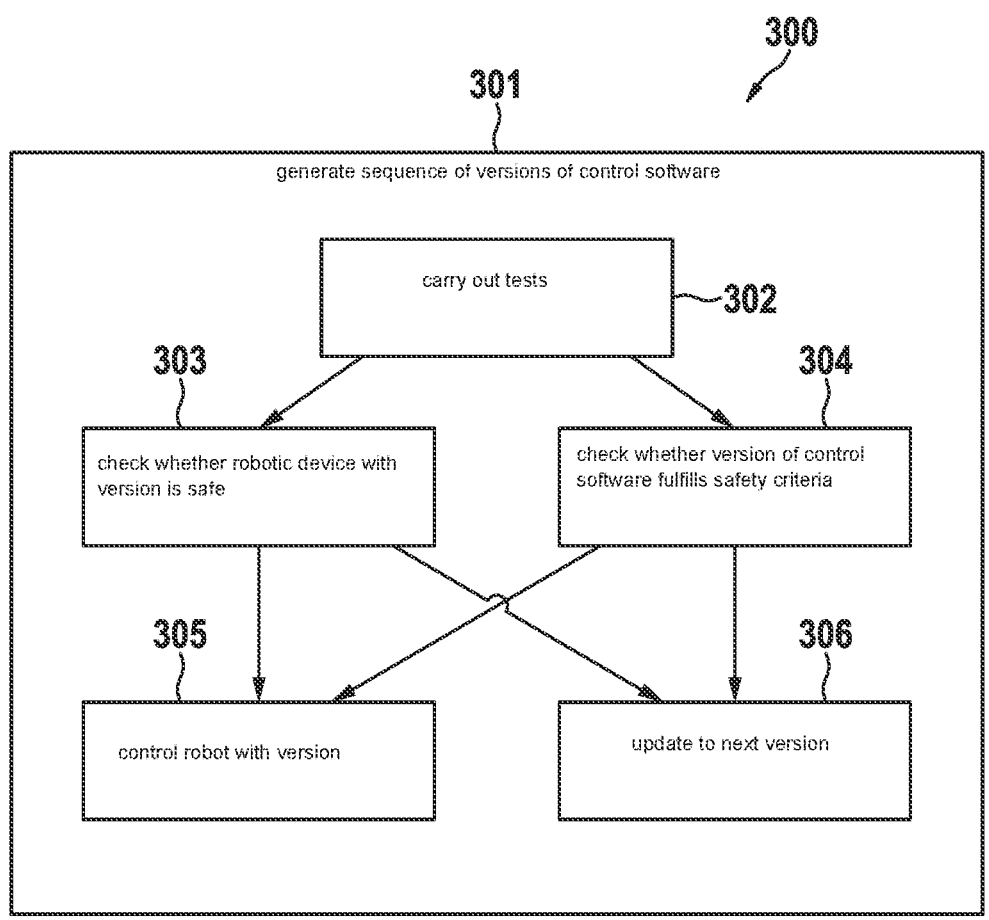
FIG. 3 shows a flowchart that illustrates a method for controlling a robotic device, according to an example embodiment of the present invention.

In summary, a method is provided according to various specific embodiments, as represented in FIG. 3.

FIG. 3 shows a flowchart 300, which illustrates a method for controlling a robotic device.

In 301, a sequence of versions of a control software is generated for the robotic device via successive updates of the control software.

In this case, for each version of the control software,
tests are carried out in 302, which deliver test values which, if they fall within predefined ranges, indicate that the control of the robotic device with the control software is safe (and if applicable, the robotic device is controlled with that version of the control software);
in 303, if the version of the control software is the initial version of the control software for which the test values delivered by the respective tests at least partially do not fall within the predefined ranges, it is checked whether the control of the robotic device with that version of the control software is safe and, if the control of the robotic device with that version of the control software is safe, safety criteria are created which are fulfilled by that version of the control software and the robotic device is controlled in 305 using that version of the control software;
in 304, if the version of the control software is not the initial version of the control software for which the test values delivered by the respective tests at least partially do not fall within the predefined ranges, it is checked whether that version of the control software fulfills the created safety criteria and, the robotic device is controlled using the version of the control software in 305, if that version of the control software fulfills the created safety criteria and, if that version of the control software does not fulfill the created criteria, it is checked whether the control of the robotic device with that control software is safe and the safety criteria and/or the tests are adapted and the robotic device is controlled using the version of the control software in 305, if the control of the robotic device using that version of the control software is safe;
in 306, the version of the control software is updated to the next version of the control software of the sequence, if the control of the robotic device with that version of the control software is not safe.

In other words, according to various specific embodiments, it is checked for one version of a control software, which is not the initial version of the control software, for which the test values delivered by the tests at least partially do not fall within predefined ranges, whether that version of the control software fulfills safety criteria, which have been created for a previous version, for which the test values delivered by the test at least partially do not fall within the predefined ranges, but which were safe, and which have been fulfilled by this version. If this is the case, the robotic device is controlled with that version of the control software.

The method of FIG. 3 may be carried out by one or by multiple computers including one or multiple data processing units. The term "data processing unit" may be understood to mean any type of entity that enables the processing of data or signals. The data or signals may, for example, be handled according to at least one (i.e., one or more than one) specific function, which is carried out by the data processing unit. A data processing unit may include or may be formed from an analog circuit, a digital circuit, a logic circuit, a microprocessor, a microcontroller, a central unit (CPU), a graphic processing unit (GPU), a digital signal processor (DSP), an integrated circuit of a programmable gate array (FPGA) or any combination thereof. Any other manner of implementing the respective functions, which are described in greater detail herein, may also be understood to be a data processing unit or logic circuit array. One or multiple of the method steps described in detail herein may be executed (for example, implemented) by a data processing unit by one or multiple specific functions, which are carried out by the data processing unit.

The approach of FIG. 3 is used to generate a control signal for a robotic device. The term "robotic device" may be understood as relating to any technical system (including a mechanical part whose movement is controlled) such as, for example, a computer-controlled machine, a vehicle, a household appliance, a power tool, a manufacturing machine, a personal assistant or an access control system. A control rule for the technical system is learned and the technical system is controlled accordingly.

Although specific embodiments are represented and described herein, it is recognized by those skilled in the art in the field that the specific embodiments that are shown and described may be replaced by a variety of alternative and/or equivalent implementations without departing from the scope of protection of the present invention. This application is intended to cover any adaptations or variations of the specific embodiments that are disclosed herein.

What is claimed is:

1. A method for controlling a robotic device, comprising:
generating a sequence of versions of a control software for the robotic device via successive updates of the control software;
for each version of the sequence of versions of the control software, carrying out respective tests which deliver test values which, based on the test values falling within predefined ranges, indicate that the control of the robotic device with the control software is safe:
based on the version of the control software being an initial version of the control software, for which test values delivered by the respective tests at least partially do not fall within the predefined ranges:
checking whether the control of the robotic device with the version of the control software is safe,
in response to the checking indicating that the control of the robotic device with the version of the control software is safe, creating safety criteria, which are fulfilled by the version of the control software, and controlling the robotic device using the version of the control software;

based on the version of the control software not being the initial version of the control software for which the test values delivered by the respective tests at least partially do not fall within the predefined ranges:
checking whether the version of the control software fulfills the created safety criteria,
controlling the robotic device using that version of the control software, in response the version of the control software fulfilling the created safety criteria,
in response to the version of the control software not fulfilling the created safety criteria;
checking whether the control of the robotic device with that control software is safe and adapting the safety criteria and/or the tests, and
controlling the robotic device using that version of the control software, in response to the control of the robotic device using that version of the control software being safe;
updating the version of the control software to a next version of the control software of the sequence, in response to the control of the robotic device with the version of the control software not being safe.

2. The method as recited in claim 1, wherein, when the version of the control software is not the initial version of the control software for which the test values delivered by the respective test at least partially do not fall within the predefined ranges, differences between the version of the control software and the initial version of the control software for which the test values delivered by the respective tests at least partially do not fall within the predefined ranges, are ascertained and it is checked based on the ascertained differences whether the version of the control software fulfills the created safety criteria.

3. The method as recited in claim 1, wherein the tests are unit tests and the test values are results of the unit tests and are coverage values that indicate the coverage of the unit tests.

4. The method as recited in claim 1, further comprising prompting a user to create the safety criteria and/or to adapt the safety criteria.

5. The method as recited in claim 1, wherein the safety criteria include parameter values and the adaptation of the safety criteria includes adaptation of the parameter values.

6. A control unit configured to control a robotic device, the control unit configured to:
generate a sequence of versions of a control software for the robotic device via successive updates of the control software;
for each version of the sequence of versions of the control software, carry out respective tests which deliver test values which, based on the test values falling within predefined ranges, indicate that the control of the robotic device with the control software is safe:
based on the version of the control software being an initial version of the control software, for which test values delivered by the respective tests at least partially do not fall within the predefined ranges:
check whether the control of the robotic device with the version of the control software is safe,
in response to indicating that the control of the robotic device with the version of the control software is safe, create safety criteria, which are fulfilled by the version of the control software, and control the robotic device using the version of the control software;
based on the version of the control software not being the initial version of the control software for which the test values delivered by the respective tests at least partially do not fall within the predefined ranges:
check whether the version of the control software fulfills the created safety criteria,
control the robotic device using that version of the control software, in response to the version of the control software fulfilling the created safety criteria,
in response to the version of the control software not fulfilling the created safety criteria:
check whether the control of the robotic device with that control software is safe and adapt the safety criteria and/or the tests and
control the robotic device using that version of the control software, in response to the control of the robotic device using that version of the control software being safe;
update the version of the control software to a next version of the control software of the sequence, in response to the control of the robotic device with the version of the control software not being safe.

7. A non-transitory computer-readable medium on which is stored commands for controlling a robotic device, the commands, when executed by a processor, causing the processor to perform the following steps:
generating a sequence of versions of a control software for the robotic device via successive updates of the control software;
for each version of the sequence of versions of the control software, carrying out respective tests which deliver test values which, based on the test values falling within predefined ranges, indicate that the control of the robotic device with the control software is safe:
based on the version of the control software being an initial version of the control software, for which test values delivered by the respective tests at least partially do not fall within the predefined ranges:
checking whether the control of the robotic device with the version of the control software is safe,
in response to the checking indicating that the control of the robotic device with the version of the control software is safe, creating safety criteria, which are fulfilled by the version of the control software, and controlling the robotic device using the version of the control software;
based on the version of the control software not being the initial version of the control software for which the test values delivered by the respective tests at least partially do not fall within the predefined ranges:
checking whether the version of the control software fulfills the created safety criteria,
controlling the robotic device using that version of the control software, in response the version of the control software fulfilling the created safety criteria,
in response to the version of the control software not fulfilling the created safety criteria;
checking whether the control of the robotic device with that control software is safe and adapting the safety criteria and/or the tests, and controlling the robotic device using that version of the control software, in response to the control of the robotic device using that version of the control software being safe;

updating the version of the control software to a next version of the control software of the sequence, in response to the control of the robotic device with the version of the control software not being safe.

* * * * *